United States Patent

Sterzer

[15] 3,636,461

[45] Jan. 18, 1972

[54] TRANSFERRED ELECTRON AMPLIFIER WITH OSCILLATION STABILIZATION CIRCUIT

[72] Inventor: Fred Sterzer, Princeton, N.J.

[73] Assignee: RCA Corporation

[22] Filed: Dec. 29, 1969

[21] Appl. No.: 888,476

[52] U.S. Cl. ........................................ 330/5, 330/34, 330/53
[51] Int. Cl. ........................................ H03f 3/04
[58] Field of Search ........................................ 330/5, 34; 331/107 G

[56] References Cited

OTHER PUBLICATIONS

Narayan et al., " Electronics Letters," Jan. 23, 1969, pp. 30–31.

*Primary Examiner*—Roy Lake
*Assistant Examiner*—Darwin R. Hostetter
*Attorney*—Edward J. Norton

[57] ABSTRACT

Stabilization of transferred electron devices having the product of carrier concentration ($n$) and length L between terminals of the device greater than $5\times10^{11}$ cm.$^{-2}$ is provided by a selective loading network.

3 Claims, 4 Drawing Figures

Figure 1:
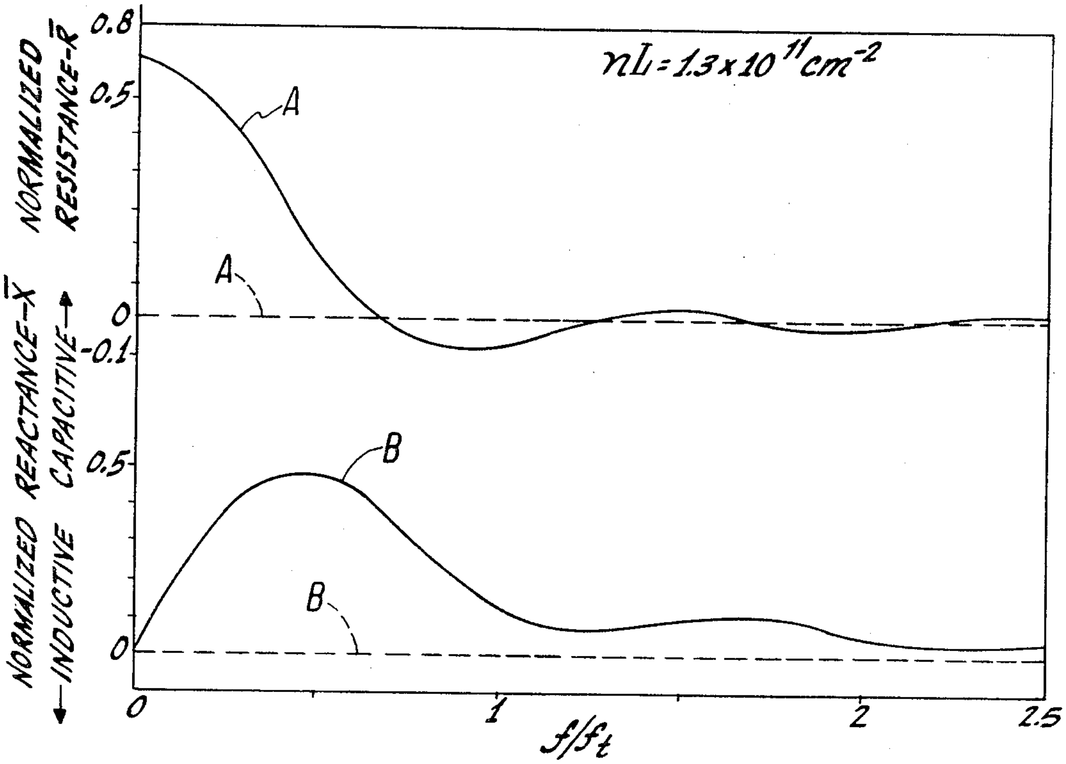

Inventor
FRED STERZER
BY Robert L. Troike
Attorney

INVENTOR.
FRED STERZER
BY Robert L. Troike
Attorney

TRANSFERRED ELECTRON AMPLIFIER WITH OSCILLATION STABILIZATION CIRCUIT

This invention relates generally to bulk-type transferred electron amplifiers where the active region is supercritically doped. The invention herein is more particularly related to a circuit arrangement for such amplifiers whereby high-power microwave amplification using supercritically doped transfer material is achieved without encountering instability.

Supercritically doped bulk transferred electron oscillator devices are known and are presently being considered for use as relatively high-power solid state microwave generators. The term "supercritically doped" refers to those transferred electron devices such as that made of Gallium Arsenide ($G_aA_s$) where the bulk region has an $n$L product greater than $\approx 5\times10^{11}$ cm$^{-2}$, where $n$ equals the carrier concentration of the bulk material and L equals the length of the sample. When such a bulk material has a DC electric field thereacross that exceeds a given threshold, such as about 3 kilovolts per centimeter, for example, the drift velocity of conduction electrons as a function of the electric field decreases. The transfer of electrons from high-velocity states to low-velocity states takes place in a short time compared to the microwave signal, giving rise to a bulk negative resistance by the transferring of electrons from a high-velocity to a low-velocity state. If the bulk material is supercritically doped, dipole layers form at or near the cathode of the material and move through the material with the drift velocity of the electron stream and disappear at the anode whereupon a new domain is formed and the process is repeated. The fundamental frequency of oscillations will be approximately equal to the transit-time frequency ($f_t$). The transit-time frequency ($f_t$) equals $V_0$/L where $V_0$ is the average drift velocity and L is the length of the material between the terminals of the device. While higher power oscillators have been associated with the supercritically doped material biased above threshold, amplifiers amplifying a frequency near the transit-time frequency with such material were unknown and were generally considered not possible.

Stable amplification has been predicted and observed in gallium arsenide GaAs transferred electron devices having $n$L products less than $5\times10^{11}$ cm.$^{-2}$. Domain formation is inhibited in these subcritically doped devices and stable amplification occurs at frequencies near the transit-time frequency and harmonics of the transit-time frequency. In supercritically doped devices having $n$L products greater than $5\times10^{11}$ cm$^{-2}$, the negative resistance associated with a propagating domain has been used to amplify signals other than at the transit-time frequency. In this instance oscillation still exists at the transit-time frequency but is isolated from the amplified signal at the substantially different frequency by a resonant trap. Coherent amplification has also been observed in supercritically doped devices by adding a constant RF power to the input signal rather than multiplying by a constant gain factor, namely by operation in a locked oscillator mode.

It is an object of this invention to provide supercritically doped transferred electron amplifiers having stable linear amplification over a wide dynamic range in a frequency band near the transit-time frequency and wherein the gain is independent of the signal amplitude from the noise level up to a maximum signal.

Briefly this and other objects of the present invention are provided by judiciously loading a supercritical transferred electron diode amplifier biased above threshold so as to provide amplification of microwave signals at frequencies close to the transit-time frequencies of the diode. Stable amplification is achieved by selectively loading the diode at the frequencies where the diode is simultaneously resonant and exhibits a real negative resistance.

Figure 2:
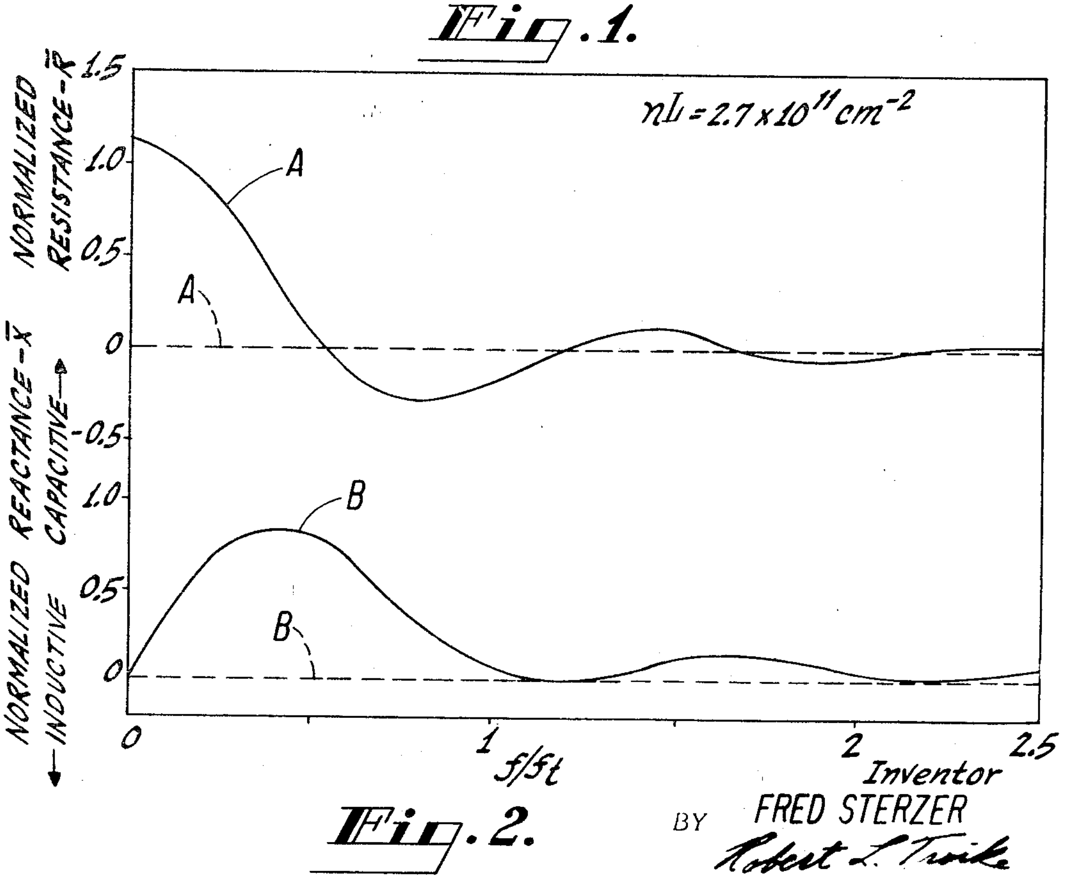
Figure 3:
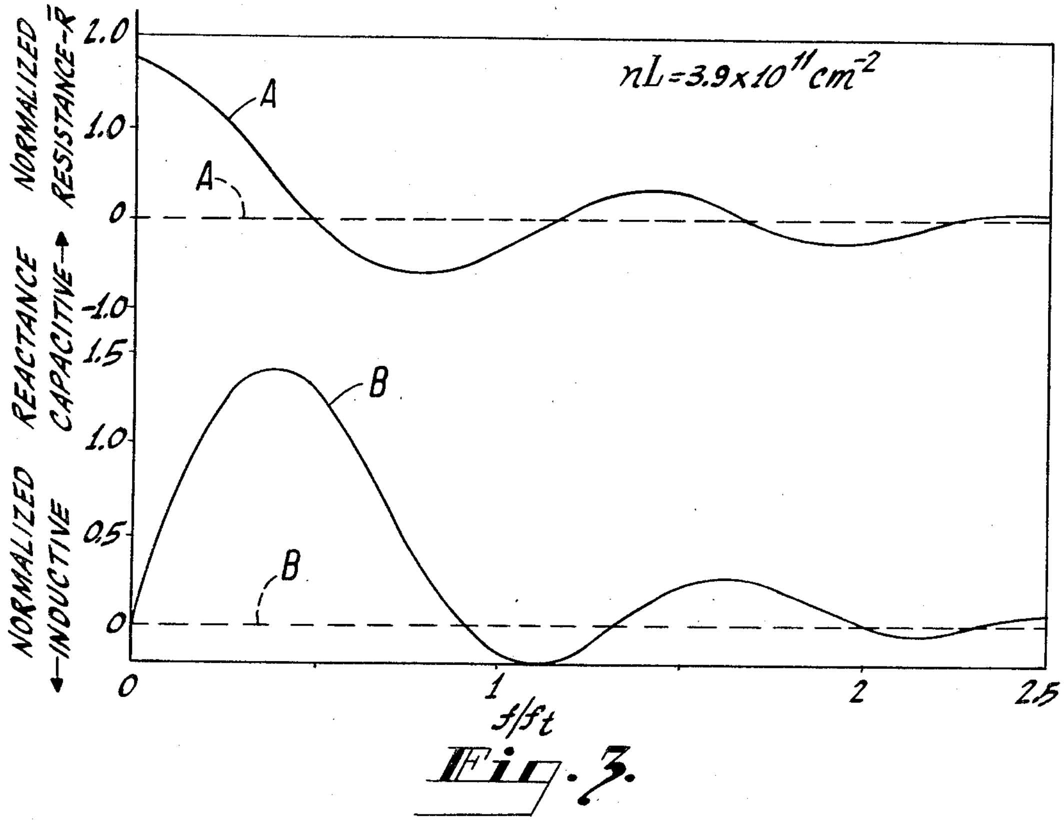
Figure 4:
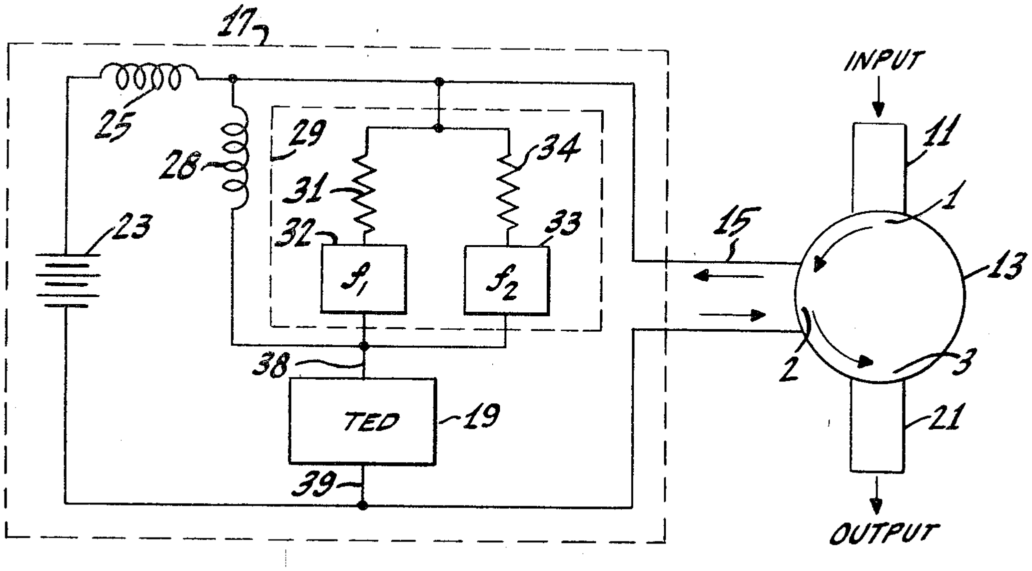

A detailed description follows in conjunction with the accompanying drawings in which:

FIG. 1 illustrates the calculated normalized resistance and normalized reactance of a bar of N-type Gallium Arsenide ($G_aA_s$) biased at an average DC electric field of approximately 5000 volts/cm. as a function of the ratio of signal frequency to the transit-time frequency for product values of carrier concentration and length equal to $1.3\times10^{11}$ cm.$^{-2}$, FIG. 2 illustrates the calculated normalized resistance and normalized reactance of a bar of N-type Gallium Arsenide ($G_aA_s$) biased at an average DC electric field of approximately 5000 volts/cm. as a function of the ratio of signal frequency to the transit time frequency for product values of carrier concentration and length equal to $2.7\times10^{11}$ cm.$^{-2}$, FIG. 3 illustrates the calculated normalized resistance and normalized reactance of a bar of N-type Gallium Arsenide ($G_aA_s$) biased at an average DC electric field of approximately 5000 volts/cm. as a function of the ratio of signal frequency to the transit time frequency for product values of carrier concentration and length equal to $3.9\times10^{11}$ cm.$^{-2}$, FIG. 4 shows a simplified schematic presentation illustrating an approach for stabilizing a supercritically doped transferred electron device in accordance with this invention.

The basic phenomenon responsible for the behavior of N-type Gallium Arsenide ($G_aA_s$) and found in certain other III–V compounds is a bulk negative differential mobility caused by the transfer of electrons heated by electric fields from high mobility to low mobility subbands, hence the name transferred electron amplifier and oscillator.

The III–V compounds are defined for the purposes of this specification as including semiconductor materials selected from the group consisting of the arsenides, phosphides, antimonides and nitrides of gallium, indium, boron or aluminum.

Considerable literature exists describing bulk-type transferred electron amplifiers and oscillators. Reference is made to an article by Hillsum entitled "Transferred Electron Amplifiers and Oscillators" in Proc. IRE, VOl. 50, Feb. 1962, pages 185–189, an article by J. Gunn entitled "Microwave Oscillation of Current in III–V Semiconductors", Solid-State Communications, Vol. 1, Sept. 1963, pages 88–91, and to the chapter written by I. B. Bach and W. Fawcett entitled "The Gunn Effect in Gallium Arsenide," Vol. 3, Advances in Microwaves, published by Academic Press, New York and London.

In materials of positive differential mobility, charges of like polarity repel one another and accumulation of space charge exponentially decays with a time constant equal to the dielectric relaxation time. In materials that are of negative differential mobility the charges of like polarity attract each other and the dielectric relaxation time is a negative quantity and any accumulation of charge will grow with time at an exponential rate. The exponential rate is equal to $$e^{\frac{Len|\mu|}{\epsilon V}}$$

where:

$L$ = length of the bar of material,
$e$ = electron charge,
$n$ = carrier concentration,
$\mu$ = differential mobility at DC bias point,
$\epsilon$ = dielectric constant of bar medium, and
$V$ = drift velocity of electrons.

If the growth of a space charge in the bar is less than 8.4, the bar is referred to as being subcritically doped, but if the growth is more than 8.4, the bar is said to be supercritically doped.

A stable uniformly doped bar, that is, a bar where the carrier concentration is substantially uniform along the length of the bar between terminals, of a medium with negative differential mobility does not exhibit a static negative resistance. Such a bar of material does, however, exhibit a negative RF resistance over certain frequency ranges.

In accordance with the designed criterion herein the circuit is considered small signal RF unstable, if and only if, there exists at least one frequency where the circuit is resonant and the resistive part of the impedance is negative.

The small signal impedance Z($\alpha$) of a bar of N-type Gallium Arsenide when the bar is biased with an average DC electric field of approximately 5000 volts/cm. can be written using several simplifying assumptions. The assumptions are (a) the contacts as terminals to the semiconductor bar have negligible resistance, (b) the doping density is uniform throughout the bar (c) effects of energy transport and diffusion of carriers are not considered and (d) velocity fluctuations are considered instantaneous functions of electric field fluctuations. This is further described by D. E. McCumber and A. G. Chynoweth in an article entitled "Theory of Negative Conductance Amplification and of Gunn Instabilities in 'Two-Valley' Semiconductor," IEEE Trans. Electron Devices, Vol. ED 13, pp. 4–21, Jan. 1966. Making these assumptions, the small signal impedance can be written as follows:

$$Z(\alpha)=\frac{L^2}{\epsilon V_0 a}\left[\frac{e^{\alpha}+\alpha-1}{\alpha^2}\right]$$

where $\epsilon$ = dielectric constant,
$V_0$ = saturation drift velocity of electrons,
$a$ = cross-sectional area of the bar, $$\alpha=\frac{L}{V_0}\left[\frac{ne\bar{\mu}}{\epsilon}-j\omega\right];$$

$\mu$ = average differential mobility at DC bias point,
$L$ = length of the bar, and
$n$ = carrier concentration.

The real and imaginary parts of the above equation are plotted in FIGS. 1, 2 and 3 as a function of the ratio of the signal frequency ($f$) to the transit-time frequency ($f_t$) for three values of the product of carrier concentration ($n$) and length ($L$). The transit-time frequency ($f_t$) is equal to $V_0/L$ where $V_0$ is the average drift velocity of the electrons in the active region and $L$ is the length of the active region between the anode and cathode terminals of the device. The FIGS. 1, 2 and 3 are each divided into two parts. The upper part of each of these figures indicates the calculated normalized resistance as a function of the ratio of the signal frequency to the transit-time frequency. The dashed line A in the upper part defines the zero resistance point with that above the dashed line being the positive resistance region and that below being the negative resistance region. The lower part of each figure indicates the calculated normalized reactance as a function of the ratio of the signal frequency to the transit-time frequency. The dashed line B in the lower part defines the zero reactance point with that above the dashed line being inductive impedance and that below being capacitive impedance. As shown in FIG. 1, where the product of carrier concentration and length ($nL$) is equal to $1.3\times10^{11}$ cm.$^{-2}$, the reactive part of the impedance of Z($\alpha$) does not vanish at any RF frequency as noted by the plot B never passing below the lower dashed line B. The normalized resistance does become negative as indicated by the resistive plot A passing below the upper dashed line A.

As noted from FIG. 1 the reactive part does not become zero while the normalized resistance becomes negative. According to the stabilizing criterion established above, Z($\alpha$) is stable. As the product of carrier concentration $n$ and length $L$ is increased, the negative resistance of the bar increases and its reactance decreases. When the product of carrier density and length ($nL$) equals $2.7\times10^{11}$ cm.$^{-2}$, the bar as illustrated in FIG. 2 is on the verge of becoming unstable. This, as indicated in FIG. 2, is because at the $f/f_t$ ratio of about 1.1, the reactance of the bar becomes zero as indicated by the reactance plot B crossing the lower dashed line B at the $f/f_t$ point where the resistance is also negative as indicated by the resistance plot A passing below the dashed line A. As the $nL$ product exceeds the value of $2.7\times10^{11}$ cm.$^{-2}$, the bar becomes unstable. As illustrated in FIG. 3, when the $nL$ product equals $3.9\times10^{11}$ cm.$^{-2}$, the bar becomes unstable at $f/f_t$ ratios equal to 0.9 and 2.05. At these $f/f_t$ ratios the reactive impedance of Z($\alpha$) is zero as indicated by the reactance plot B crossing the lower dashed line B and the corresponding resistance is negative as indicated by the resistance plot A passing below the upper dashed line A.

As mentioned previously, the measured critical value of $nL$ product for GaAs is approximately $5\times10^{11}$ cm.$^{-2}$. The difference between the calculated limit of $2.7\times10^{11}$ cm.$^{-2}$ used in connection with FIGS. 1, 2 and 3 above and the measured limits of $\approx 5\times10^{11}$ cm.$^{-2}$ are believed due to the simplifying assumptions used in deriving the small signal impedance equation. The calculations above indicate a trend such that, as the $nL$ product increases, the reactance of the bar at certain frequencies related to the transit-time frequency becomes zero and the resistance is negative and that they occur simultaneously.

In accordance with the applicant's invention, stabilizing the supercritically doped bar is achieved by application of the principles illustrated in connection with FIG. 4. FIG. 4 shows a reflector-type amplifier circuit with the RF input signal received from a source at input port 11 coupled through a circulator 13 to a transferred electron diode module 17 via port 2 of the circulator 13 and waveguide section 15. The transferred electron diode 19 (TED) in a reflector-type arrangement is coupled across the circuit in module 17. By way of example, the circuit of module 17 may be a waveguide with one end terminated and the opposite end coupled to waveguide section 15. The diode would have one of its terminals 39 connected to one waveguide wall with the diode extending across the waveguide aperture toward the opposite wall with the opposite terminal 38 RF coupled by a capacitance to the opposite waveguide wall. The amplified signal at the diode 19 is coupled back to the circulator 13 along waveguide section 15 and from the output port 21. The DC biasing network for the diode 19 is provided by a battery 23 coupled across the diode 19 with one end of the battery connected to one terminal 39 of the diode and with the opposite end of the battery coupled through RF choke coils 25 and 28 to the opposite terminal 38 of the transferred electron diode 19. A stabilizing network 29 is coupled between one end of RF choke coil 25 and diode 19 so as to be in shunt with RF choke coil 28. The stabilizing network 29 includes, for example, a first resistor 31 in series with a first frequency selective circuit 32 and a second resistor 34 in series with a second frequency selective circuit 33. The series combination of resistor 31 and frequency selective circuit 32 is in parallel relation with respect to the series combination of resistor 34 and frequency selective circuit 33.

Frequency selective circuits 32 and 33 are such as to present a high impedance to signals at all frequencies except one. At this one frequency the circuits present a low impedance. Circuit 32 provides a low impedance at one frequency ($f_1$) where the diode 19 is resonant and where the real part of the impedance of the diode 19 is negative. For example, referring to FIG. 3, the frequency at which circuit 32 should present a low impedance is at that frequency where the ratio $f/f_t$ would be equal to 0.9. Likewise, with reference to FIG. 3, the frequency $f_2$ at which circuit 33 should present a low impedance is where the ratio $f/f_t$ equals 2.07. The resistor 31 has a value such that at the frequency $f_1$ where diode device 19 is resonant and where the real part of the impedance of the diode device is negative, the positive resistance of resistor 31 is greater than the real part of the impedance of the device at frequency $f_1$. Likewise, resistor 34 has a value such that at frequency $f_2$ where diode device 19 is resonant and where the real part of the impedance of the diode device is negative, the positive resistance of resistor 34 is greater than the real part of the impedance of the device at frequency $f_2$.

The stabilized device will in general exhibit a negative resistance over large frequency ranges and can therefore be used as the active element in linear reflection-type circulator amplifiers. The design of the network is based on the general reasoning that the series circuit with a transferred electron device will be small signal RF unstable, if and only if, it exhibits at least a frequency where the circuit is resonant and the resistive part of the impedance circuit is negative. Therefore, the impedance of the stabilizing network, must be chosen such that the real part of the impedance in any combination of the stabilizing network and the supercritically doped device is not negative at any frequency where the reactive part of their combined impedance equals zero. The impedance of the stabilizing network may, as shown herein, be a network for selectively adding a real positive resistance at the resonant frequency point or may be one that adds reactances at these points to place the reactance curve B above or below the dashed lines B in FIGS. 1 thru 3.

At present, the lowest practical carrier concentration that can be achieved reproductably in epitaxial $G_aA_s$ is $\approx 5\times10^{14}$ cm.$^{-3}$. Thus, because $nL$ products that exceed $\approx 5\times10^{11}$ cm.$^{-2}$ are considered unstable, the lowest frequency of operation for epitaxial $G_aA_s$ amplifiers is about 20 $GH_z$. As described above by the judicious loading of the amplifier devices, amplification can be achieved at microwave frequencies for the same carrier concentration.

What is claimed is:

1. A transferred electron diode amplifier capable of amplifying microwave signals at frequencies close to the transit-time frequency of said diode comprising:

a diode including a uniformly doped bar of a transferred electron material said bar having a given length and being supercritically doped such that the product of the length of the bar and the carrier concentration exceeds $5\times10^{11}$ cm.$^{-2}$, means for coupling said signal at said frequencies close to the transit-time frequency of the diode to and from said diode, means for applying sufficient DC bias across said diode to bias said diode beyond threshold into the region wherein said diode exhibits a negative RF resistance over certain frequency ranges causing instability of said diode, means for loading said diode at the frequencies where simultaneously said diode is resonant and said diode exhibits a real negative resistance to thereby stabilize said diode to provide substantially linear amplification of said signals at said frequency close to the transit-time frequency.

2. The combination as claimed in claim 1 wherein said means for selectively loading includes a network in series with said diode having a sufficient positive resistance to present a greater positive resistance than said real negative resistance exhibited by said diodes at said frequency.

3. The combination as claimed in claim 2 wherein said network includes at least one frequency selective circuit in series with a resistance.

* * * * *